P. SAUVAGE.
ALTERNATING CURRENT GENERATOR.
APPLICATION FILED NOV. 6, 1912.
1,203,416.
Patented Oct. 31, 1916.
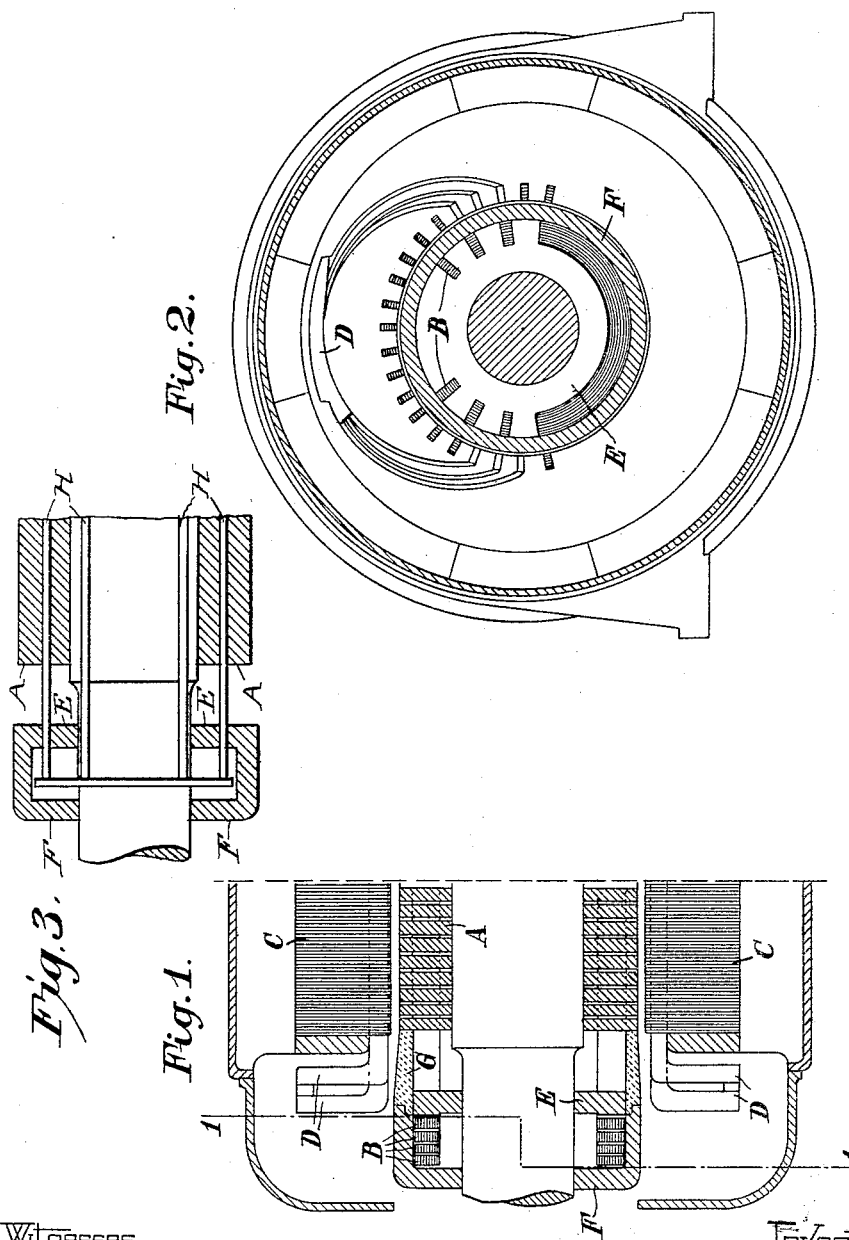

UNITED STATES PATENT OFFICE.

PAUL SAUVAGE, OF PARIS, FRANCE, ASSIGNOR TO SOCIÉTÉ ANONYME DITE ATELIERS DE CONSTRUCTIONS ELECTRIQUES DU NORD ET DE L'EST, OF PARIS, FRANCE.

ALTERNATING-CURRENT GENERATOR.

1,203,416.  Specification of Letters Patent.  Patented Oct. 31, 1916.

Application filed November 6, 1912. Serial No. 729,793.

*To all whom it may concern:*

Be it known that I, PAUL SAUVAGE, a citizen of the Republic of France, residing at Paris, in the Republic of France, have invented certain new and useful Improvements in Alternating-Current Generators, of which the following is a specification.

It is well known that the sudden short-circuiting of an alternator results in the production of a very heavy momentary current, the action of which is particularly serious in connection with the windings of machines of great output per pole, for example, turbo-alternators.

The strength of the momentary current depends upon the relation between the mutual inductance of the windings and their total leakage inductance, being greater according as this relation becomes greater.

In order to guard against the dangerous effects of such short circuits it has already been proposed to place an additional inductance in series with the alternating current portion of the machine, that is the stator. The results obtained with this arrangement are effective for the object under discussion, the addition of an external inductance being equivalent to an increase of the co-efficient of leakage inductance, but at the same time the inherent regulation of the machine must evidently be altered.

This invention consists in an arrangement having the same efficacy without having the same disadvantage. This arrangement consists in applying an additional inductance to the circuit of the direct current part of the machine, that is the rotor, in such a way that the normal working of the machine is not modified.

In order that the arrangement may be fully effective it is necessary to take certain precautions. Thus, the metal wedges which, in accordance with current practice, are employed for fixing the winding in place, should be insulated and the magnetic core of the rotor should be constructed of thin disks or sheets so as to suppress all damping action. Under such conditions the analysis of the momentary phenomena occurring on short circuit shows that the rise of current in the stator is accompanied by a periodic variation of the current in the rotor and that the presence of the inductance in the excitation circuit arranged in accordance with this invention results in the modification of the phenomena in the same manner as an inductance inserted in the stator.

Evidently the position of the inductance may be varied. It would be possible to place this inductance in the rotor circuit outside the machine, but in such a case the arrangement would result in the production at the moment of short circuit of a dangerous rise of potential at the terminals of the rotor. It is accordingly preferable to mount the inductance on the rotor itself, adopting a disposition analogous or equivalent to that illustrated by way of example in the accompanying drawing.

Figure 1 represents a longitudinal section of a part of an alternator for illustrating the new invention; Fig. 2 is a cross section on the line 1—1 of Fig. 1. Fig. 3 is a similar view to Fig. 1 but shown diagrammatically in order to show the damping circuits.

In Figs. 1 and 2 A indicates the core of the rotor, B the end portion of the coils of the winding of the rotor, C the laminations of the stator, and D the winding of the stator.

The additional inductance, in accordance with the present invention, is produced by the action of a branch magnetic circuit comprising a disk E and the yoke F, these parts being made of iron. This circuit is linked with the winding B of the rotor. The binding or inclosing ring G is preferably of non-magnetic metal.

It will be obvious that a branch magnetic circuit thus produced will not have any influence on the stator circuit during normal operation, and accordingly will be without effect on the regulation of the machine.

In order to avoid phase swinging, which, under certain conditions may manifest itself in an alternator having a rotor unprovided with damping devices, it may be necessary to provide a complete damping arrangement on the rotor. Such an arrangement is illustrated diagrammatically in Fig. 3. In this case, in order to preserve the effectiveness of the arrangement, it is only necessary to arrange the damping circuits H so as to be linked with the branch magnetic circuit. Further, the principal winding itself can be arranged in known manner to form a complete damping circuit.

I declare that what I claim is:—

1. An alternating current generator comprising a main magnetic circuit in two parts one of which is movable with respect to the other, a winding fitted on one of said parts and connected to a source of direct current so as to produce a flux in said magnetic circuit, a second winding adapted to generate alternating current when a relative movement takes place between said parts and an auxiliary magnetic circuit isolated from the main circuit and connected to the direct current winding adapted to reduce any momentary short-circuit.

2. An alternating current generator comprising a main magnetic circuit consisting of a rotary part and a stationary part, a winding upon the rotary part connected to a source of direct current so as to produce flux in said magnetic circuit, a second winding connected to said stationary part and adapted to generate alternating current due to the rotation of the rotary part and an isolated auxiliary magnetic circuit excited by the direct current winding adapted to increase any self-inductance and so reduce any momentary short-circuit current.

3. An alternating current generator comprising a main magnetic circuit comprising a laminated rotary part and a stationary part, a winding upon the rotary part connected to a source of direct current so as to produce a flux in said magnetic circuit, a second winding connected to said stationary part and adapted to generate alternating current due to the rotation of the rotary part, means holding said first winding in position and isolated from the laminations and an isolated auxiliary magnetic circuit excited by the direct current winding.

4. An alternating current generator comprising a main magnetic circuit having a rotary part and a stationary part, a winding upon the rotary part connected to a source of direct current so as to produce a flux in said magnetic circuit, a second winding connected to said stationary part and adapted to generate alternating current due to the rotation of the rotary part and an auxiliary magnetic circuit excited by the direct current winding and provided with a non-magnetic gap.

5. An alternating current generator comprising a main magnetic circuit having a rotary part and a stationary part, a winding on the rotary part connected to a source of direct current to excite said magnetic circuit, a second winding upon the stationary part adapted to generate alternating current due to the rotation of said rotary part and an auxiliary magnetic circuit mounted on the rotor and isolated from the main magnetic circuit.

6. An alternating current generator comprising a main magnetic circuit having a rotary part and a stationary part, a winding upon the rotary part connected to a source of direct current adapted to excite said magnetic circuit, a second winding mounted upon the stationary part and adapted to generate alternating current when said rotary part is in motion, members of magnetic material mounted upon the rotary shaft, said members forming with the shaft an auxiliary magnetic circuit which is excited by said direct current winding and a ring of non-magnetic material separating the said magnetic members from the main circuit and producing a non-magnetic gap in the auxiliary magnetic circuit.

7. An alternating current generator comprising a main magnetic circuit having a rotary and a stationary part, a winding upon the rotary part connected to a source of direct current so as to excite said magnetic circuit, a second winding connected to said stationary part and adapted to generate alternating current due to the rotation of the rotary part, damping circuits and an isolated auxiliary magnetic circuit excited by said direct current winding and said damping circuits.

8. An alternating current generator comprising a main magnetic circuit having two parts movable with respect to each other, a winding on one of said parts connected to a source of direct current and adapted to excite said magnetic circuit, a second winding on one of said parts adapted to generate alternating current when said parts are in motion relative to each other, said direct current winding being connected with an inductive circuit isolated from the main circuit.

In witness whereof, I have hereunto signed my name this 25th day of October 1912, in the presence of two subscribing witnesses.

PAUL SAUVAGE.

Witnesses:
ALPHONSE MEJEAN,
HANSON C. COXE.